(12) United States Patent
Orazi et al.

(10) Patent No.: US 8,533,805 B2
(45) Date of Patent: Sep. 10, 2013

(54) CERTIFICATES TO CREATE PRODUCT MAPPINGS

(75) Inventors: Michael Orazi, Cary, NC (US); Dennis George Gregorovic, Wakefield, MA (US)

(73) Assignee: Red Hat, Inc., Raleigh, NC (US)

( * ) Notice: Subject to any disclaimer, the term of this patent is extended or adjusted under 35 U.S.C. 154(b) by 189 days.

(21) Appl. No.: 13/049,460

(22) Filed: Mar. 16, 2011

(65) Prior Publication Data

US 2012/0240244 A1 Sep. 20, 2012

(51) Int. Cl.
- *G06F 7/04* (2006.01)
- *G06F 15/16* (2006.01)
- *G06F 17/30* (2006.01)
- *H04L 29/06* (2006.01)

(52) U.S. Cl.
USPC .......... 726/10; 726/1; 726/2; 726/16; 726/27; 726/29; 705/51; 705/59; 705/14.22; 705/901; 707/708; 707/726; 707/771; 707/781; 707/782; 707/783; 707/784; 707/785; 713/156; 713/185; 711/145; 711/163; 711/164

(58) Field of Classification Search
USPC ........................................................ 726/29
See application file for complete search history.

(56) References Cited

U.S. PATENT DOCUMENTS

| | | | |
|---|---|---|---|
| 6,223,291 B1 | 4/2001 | Puhl et al. | |
| 6,510,513 B1 * | 1/2003 | Danieli | 713/156 |
| 7,200,632 B1 * | 4/2007 | Greschler et al. | 709/203 |
| 7,650,492 B2 * | 1/2010 | Sherwani et al. | 713/151 |
| 7,742,992 B2 | 6/2010 | Cronce | |
| 2006/0064582 A1 | 3/2006 | Teal et al. | |
| 2006/0190275 A1 * | 8/2006 | Dupree et al. | 705/1 |

* cited by examiner

*Primary Examiner* — Nathan Flynn
*Assistant Examiner* — Bryan Wright
(74) *Attorney, Agent, or Firm* — Lowenstein Sandler LLP

(57) ABSTRACT

A server receives a consumer request pertaining to product asset management from a client. The consumer request comprises one or more product-related certificates that associates the client with one or more products. The product-related certificate comprises at least one extended attribute object identifier that has a corresponding product attribute. For each extended attribute object identifier, the server searches a data store to identify a product that corresponds to the extended attribute object identifier and generates a response to the consumer request based on the product that is identified in the data store.

20 Claims, 10 Drawing Sheets

CERTIFICATES TO CREATE PRODUCT MAPPINGS

RELATED APPLICATION

The present application is related to co-filed U.S. patent application Ser. No. 13/049,532 entitled "Using Entitlement Certificates to Manage Product Assets", which is assigned to the assignee of the present application.

TECHNICAL FIELD

Embodiments of the present invention relate to product asset management. Specifically, the embodiments of the present invention relate to certificates to create product mappings.

BACKGROUND

A software provider can sell software and/or service products, for example, by selling subscriptions to customers for products. An entity that has purchased a product subscription is an owner of the subscription and has a right to use the product for the period of the subscription. An owner's use of a subscription can be represented, for example, as an 'entitlement.' For example, a customer, such as ACME Company, purchases ten 3-year subscriptions to Product Foo. ACME Company is the owner of the ten subscriptions, which can be represented by ten entitlements, and can assign the ten entitlements to various systems. When a system is granted an entitlement, the system can access a product repository to receive product updates for the Product Foo.

Product asset management tools are provided to allow software providers and customers to manage the product subscriptions that have been purchased and consumed, the patches, updates, etc. Conventional product asset management tools, however, do not offer a convenient way to know what products have been installed in various systems. In addition, in a traditional product asset management environment, the various systems register with a central authority to receive an entitlement from the central authority to access a product repository coupled to a content server. A content server can manage access to product repositories that store product software (e.g., installation software, software updates, patches) for different products. Systems can send a request to the content server for access to a product repository, for example, to receive a product software update. The content server, however, does not have the ability without the central authority to determine whether a system is authorized to access the product repository.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for using certificates to create product mappings. A server receives a consumer request pertaining to product asset management from a client. The consumer request comprises one or more product-related certificates that associates the client with one or more products. The product-related certificate comprises at least one extended attribute object identifier that has a corresponding product attribute. For each extended attribute object identifier, the server searches a data store to identify a product that corresponds to the extended attribute object identifier and generates a response to the consumer request based on the product that is identified in the data store.

Conventional product asset management tools do not offer a convenient way to know what products have been installed in various systems. In addition, in a traditional product asset management environment, a product content server does not have the ability to determine whether a system is authorized to access a product repository without communicating with a central authority. Embodiments of the present invention allow computing systems to use product-related certificates to automatically provide product information to a server computing system. Embodiments of the present invention also provide greater security in that a server can determine whether the product-related certificate is valid and not revoked before deciding how to manage product assets.

Figure 1:
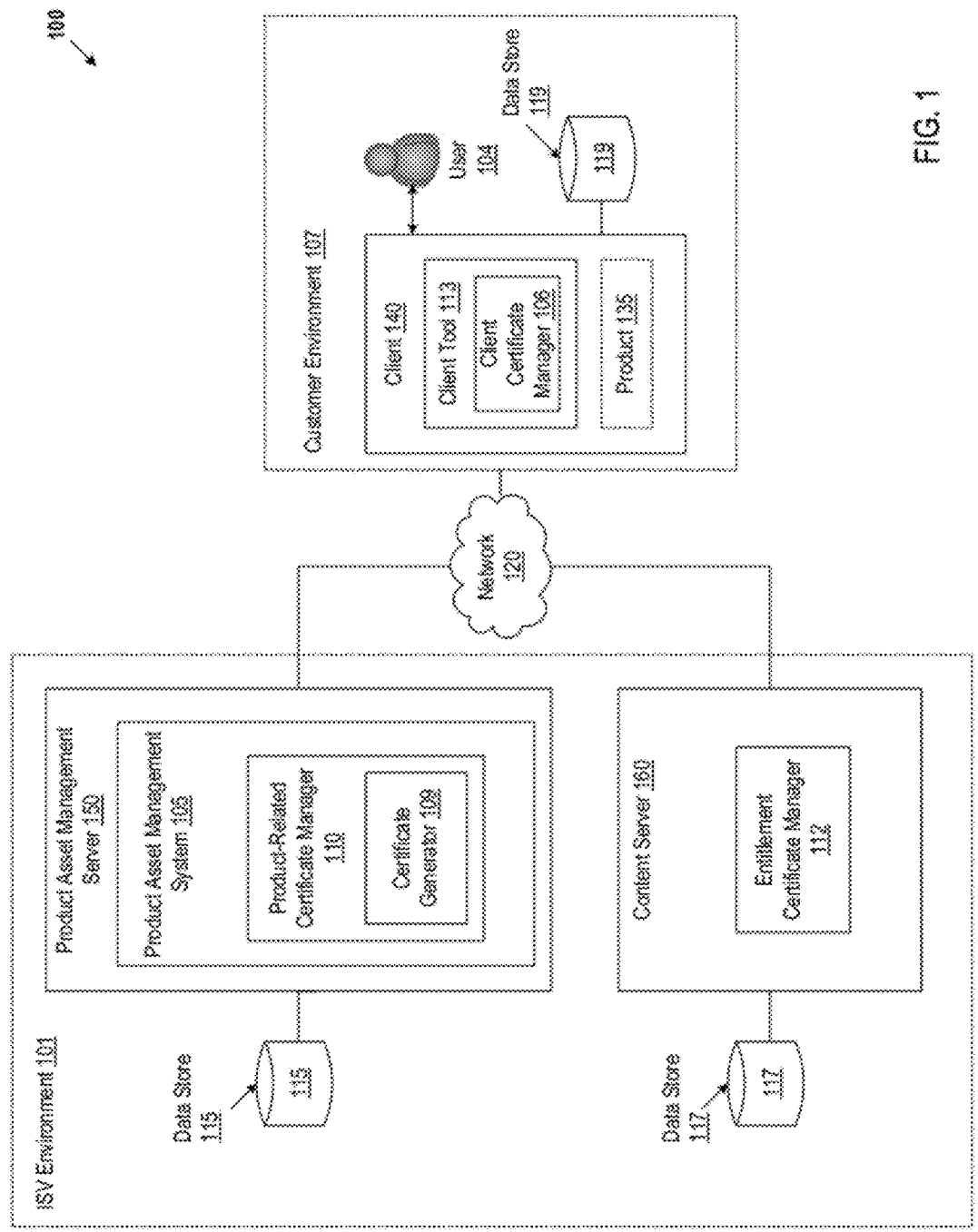
FIG. 1 is an exemplary network architecture in which embodiments of the present invention may operate.

FIG. 1 is an exemplary network architecture 100 in which embodiments of the present invention can be implemented. The network architecture 100 can include a software provider environment, such as an independent software vendor (ISV) environment 101, communicating with one or more customer environments 107 via a network 120. A customer environment 107 includes one or more clients 140 communicating with the servers 150,160 via the network 120. The network 120 can be a local area network (LAN), such as an intranet within a company, a wireless network, a mobile communications network, a wide area network (WAN), such as the Internet, or similar communication system. The network 120 can include any number of networking and computing devices such as wired and wireless devices.

Software providers can develop and/or sell software and/or service products. A software provider can be a large software company that develops and sells operating system platforms, an ISV that develops and sells specialized software to run on an operating system platform, and/or an independent service provider (ISP) that does not develop, but sells products. For brevity and simplicity, an ISV is used as an example of a software provider throughout this document. Customers that purchase subscriptions are owners of the subscriptions. A subscription purchase is an owner's right to use the product for the period of the subscription. An owner's use of a subscription can be represented, for example, as an 'entitlement.' A consumer is an entity that has been granted an entitlement to allow the entity to access product repositories. Product software may or may not already be installed on an entity. Examples of entities include, and are not limited to, a client computing system, a server computing system, a domain, etc. Product software that is already installed on an entity can be somewhat usable, even if the entity is not granted an entitlement for the installed software. When an entity is granted an entitlement for the software, the entity can access one or more product repositories to receive installation software, software updates, etc., for one or more products.

Software providers and customers can track which product subscriptions have been purchased and which of the purchased subscriptions have been consumed. The tracking of purchased and consumed products is hereinafter referred to as 'product asset management.' Product asset management can also include tools to manage the consumers in their environments. These tools may, for example, allow system administrators, such as user 104, to manage patches, updates, monitoring and maintenance of the entitlements, etc. A software provider environment, such as ISV environment 101, can include a product asset management server 150 that hosts a product asset management system 105 for managing product assets in the one or more customer environments 107. A product asset management server 150 can manage product assets, for example, by registering entities, managing subscriptions for various owners, managing product asset business model data, managing the assignment of entitlements to various entities, etc. The product asset management system 105 can include, for example, a Java web application based on a REST (Representational State Transfer) client-server architecture that exposes a REST API. A product asset management server 150 can be hosted by any type of computing device including server computers, gateway computers, desktop computers, laptop computers, hand-held computers or similar computing device. An exemplary computing device is described in greater detail below in conjunction with FIG. 10.

The product asset management system 105 can include a product-related certificate manager 110 that uses product-related certificates to create product mappings for managing product assets. A product-related certificate associates an owner of the certificate with one or more products. Examples of product-related certificates can include, and are not limited to, a product certificate and an entitlement certificate. A product certificate can represent products that are installed in a computing system. An entitlement certificate can represent an entitlement to allow an entity access to a product repository.

A product-related certificate is a digital SSL certificate, such as an X.509 certificate. A product-related certificate manager 110 can include or be coupled to a certificate generator 109 that generates digital certificates. Examples of a certificate generator 109 can include, and are not limited to, OpenSSL, Enterprise Java Bean Certificate Authority (EJBCA), Bouncy Castle Crypto Certificate Generator API, etc. The product-related certificate manager 110 can generate various types of product-related certificates (e.g., product certificate, entitlement certificate) and can distribute the product-related certificates to enable owners of the product related certificates to provide product information to a server computing system.

For example, the product-related certificate manager 110 can generate a product certificate. In one embodiment, a server computing system (not shown) in the ISV environment 101 may package installation software for one or more products on installation DVDs. The server computing system can host a product-related certificate manager 110 to generate product certificates to be included with the product installation software. For instance, a product-related certificate manager 110 in an ISV environment 101 can generate a product certificate pertaining to product 135 'Product Foo'. The Product Foo product certificate can be stored with installation software for Product Foo, such as product installation DVDs. ACME Company may be a customer of the ISV, and its environment 107 can include one or more clients 140 that can communicate to the servers 150,160 in the ISV environment 101. A user 104, such as an ACME Company system administrator, may have installed Product Foo 135 on the client 140 using the installation DVDs. A product certificate for Product Foo 135 can be stored in the data store 119 as part of the installation process.

In another example, the product-related certificate manager 110 generates an entitlement certificate. For instance, the product asset management system 105 may receive a consumer request from client 140 for an entitlement for Product Foo 135. The product-related certificate manager 110 may determine that it can grant an entitlement to the client 140 and can generate an entitlement certificate to represent the entitlement, and send the entitlement certificate to the client 140. The entitlement certificate can specify one or more product repositories which the client 140 is authorized to access.

Computing systems, such as client 140, can receive a product-related certificate and store the product-related certificate in a data store 119 that is coupled to the client 140. The client 140 can subsequently generate a consumer request that includes a product-related certificate that may be stored in the data store 119. A client 140 can include a client tool 113 to generate a consumer request, include a product-related certificate in the consumer request, and send the consumer request to an appropriate server. In one embodiment, a product-related certificate manager 110 and an entitlement certificate manager 112 exposes a programmatic REST interface, which a client tool 113 can communicate with. In one embodiment, a client tool 113 can be any kind of tool which could communicate with the REST interface. Other examples of a client tool 113, can include and are not limited to, a web interface, web browser, or other client software that can communicate with the REST interface. The client machines 140 can be hosted by any type of computing device including server computers, gateway computers, desktop computers, laptop computers, mobile communications devices, cell phones, smart phones, hand-held computers, or similar computing device. An exemplary computing device is described in greater detail below in conjunction with FIG. 10.

The client tool 113 can include a client certificate manager 106 to generate a consumer request pertaining to product asset management. Examples of a consumer request can include, and are not limited to, a request for product subscriptions that are available to an entity, for an entitlement for a particular product, for access to a product repository, etc. The client certificate manager 106 can generate a consumer request that includes a product-related certificate (e.g., product certificate, entitlement certificate) and can send the consumer request to an appropriate server computing system (e.g. content server 160, product asset management server 150).

For example, the client certificate manager 106 can generate a consumer request for a list of product subscriptions that are available to the client 140 and send it to the product asset management system 105. The consumer request can include one or more product certificates that are stored in the data store 119. The product certificates represent the products that are installed on the client 140. The product-related certificate manager 110 in the product asset management system 105 can determine which subscriptions are available and applicable to the client 140 using the product certificates received in the consumer request.

In another example, the client certificate manager 106 can generate a consumer request to access a product repository and send it to a content server 160. A content server 160 can manage access to product repositories that store product software (e.g., installation software, software updates, patches), product documentation, etc. for different products. A content server 160 can be coupled to one or more data stores 117 that represent one or more product repositories. A product repository can store product related material, such as installation software, software updates, patches, software documentation, etc. A content server 160 can be hosted by any type of computing device including server computers, gateway computers, desktop computers, laptop computers, hand-held computers or similar computing device. In one embodiment, the content server 160 is hosted by a computing device that is separate from a product asset management server 150 that hosts a product asset management system 105. In another embodiment, the content server 160 is hosted by a computing device that also hosts a product asset management system 105. An exemplary computing device is described in greater detail below in conjunction with FIG. 10.

Systems, such as client 140, can send a consumer request to the content server 160 for access to a product repository, for example, to receive a product software update. The consumer request can include one or more entitlement certificates that are stored in the data store 119. The entitlement certificates represent the product repositories which the client 140 is authorized to access. A content server 160 can include an entitlement certificate manager 112 to use product-related certificates to manage access to product repositories that are coupled to the content server 160. The entitlement certificate manager 112 can determine whether to grant the client 140 access to the product repository using the one or more entitlement certificates received in the consumer request.

In one embodiment, the client 140 stores a list of product repositories that corresponds to products in the data store 119. Product installation software can include a list of product repositories for product updates. The list can include the locations (e.g., URLs) of the product repositories. The client certificate manager 106 can receive a product-related certificate that includes an extended attribute OID that is paired with a metadata tag. The client certificate manager 106 can use the metadata tag to perform a task. For example, based on the metadata tag, the client certificate manager 106 can add or remove product repositories from the list that is stored in the data store 119

A data store 115,117,119 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 2:
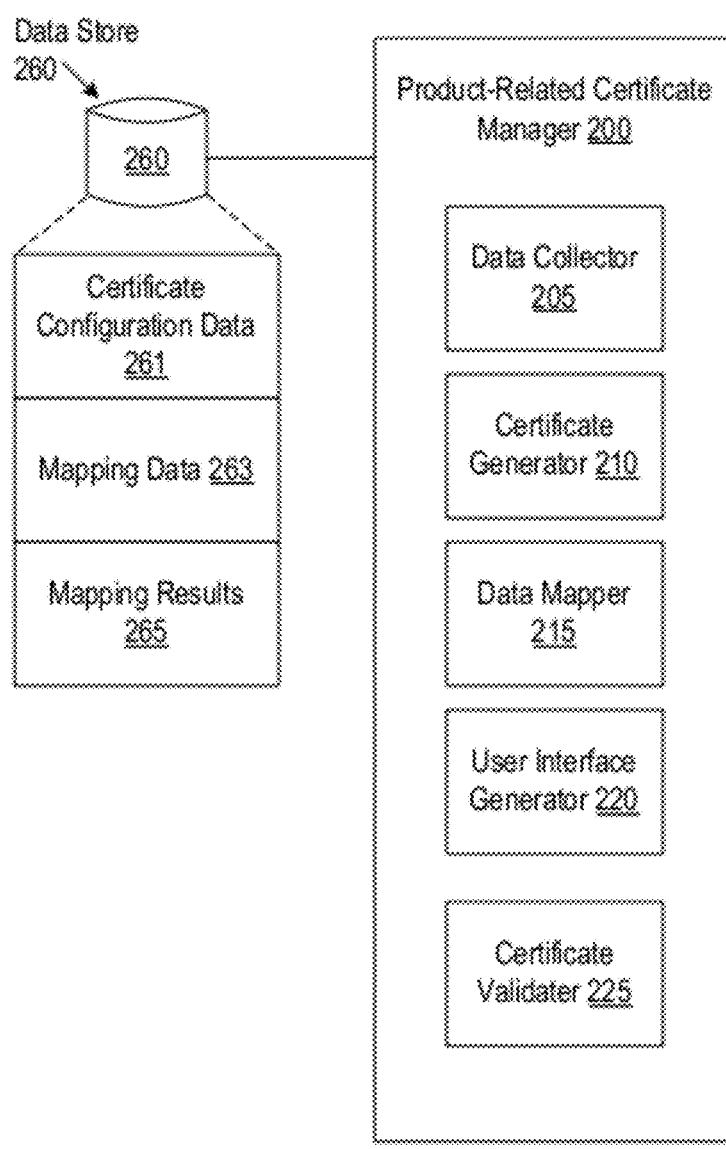
FIG. 2 is a block diagram of one embodiment of a product-related certificate manager.

FIG. 2 is a block diagram of one embodiment of a product-related certificate manager 200 for using certificates to create product mappings. The product-related certificate manager 200 can be the same as the product-related certificate manager 110 hosted by a server 150 of FIG. 1. The product-related certificate manager 200 includes a data collector 205, a certificate generator 210, a data mapper 215, a user interface generator 220, and a certificate validator 225.

The product-related certificate manager 200 can receive a request to generate a product-related certificate. The request can be user input received via a user interface provided by the user interface generator 220. The user interface can be a command line interface, a graphical user interface (GUI), or similar type of user interface. For example, a server computing system may package installation software for one or more products and may invoke a product-related certificate manager 200 to generate product certificates to be included with the product installation software. A user may enter a command via the command line interface requesting the product-related certificate manager 200 to generate the product certificates. The product-related certificate manager 200 can also receive a request from a product asset management system. For example, the product asset management system may receive a consumer request from a client for an entitlement in order to access a product repository and can instruct the product-related certificate manager 200 to generate the entitlement certificate for the client.

The product-related certificate manager 200 can include or be coupled to a certificate generator 210 to generate certificates. Examples of a certificate generator 210 can include, and are not limited to, OpenSSL, EJBCA, Bouncy Castle Crypto Certificate Generator API, etc. A product-related certificate can be a digital SSL certificate, such as an X.509 certificate, that includes one or more extended attribute object identifiers (OIDs), each of which can be paired with a product attribute. An OID can be a value in a hierarchical numbering scheme. For example, an OID can be "1.3.6.1.4.1.2312.9.2.5501.1.6". Examples of product attributes can include, and are not limited to, a product name, a product variant, a product version, a system architecture that is supported by a product, a location of a product repository (e.g., a uniform resource locator (URL)) that an owner of a product-related certificate is authorized to access, and a metadata tag pertaining to a client task to be performed. For instance, an entitlement certificate can include an OID-URL pair, where the OID "1.3.6.1.4.1.2312.9.2.5501.1.6" is paired with a URL "content/dist/sampleos/foo/server/$releasever/$basearch/foo/1.1/os," indicating that the owner of a valid entitlement certificate can access the URL "content/dist/sampleos/foo/server/$releasever/$basearch/foo/1.1/os." The URL can be a partial URL, such as a relative URL, which is a URL that does not contain a domain (e.g., www.sample.com) and/or a protocol (e.g., http).

The certificate generator 210 can use certificate configuration data 261 to generate certificates. The configuration data 261 can include the product data to be included in a product-related certificate. Examples of product data can include, and are not limited to, a product name, a product variant, a product version, a system architecture that is supported by a product, a location of a product repository (e.g., URL), and a metadata tag pertaining to a client task to be performed. Different types of product-related certificates can include different types of data to create product mappings. For example, an entitlement certificate can be a representation of an entitlement to allow an entity access to a product repository. An entitlement certificate type can include OIDs that are each paired with a location of a product repository (e.g., a URL) that an owner of the entitlement certificate is authorized to access. A product certificate can represent one or more products that are installed in a computing system. A product certificate type can include OIDs that are each paired with a product name. Embodiments of exemplary product-related certificates having an OID-product attribute pair are described in greater detail below in conjunction with FIG. 6 and FIG. 8.

The product-related certificate manager 210 can be coupled to a data store 260 that stores certificate configuration data 261 relating to the various types of certificates that can be generated for various products. The configuration data 261 can be a configuration file that is accessed by the certificate generator 210 for generating the certificates. There can be a configuration file for each certificate type. There can be a configuration file for each product. A product can include a bundle of products. There can also be a configuration file that includes configuration data for multiple products.

A request to generate a product-related certificate can identify which type of certificate to generate (e.g., product certificate, an entitlement certificate), and a data collector 205 can select the appropriate configuration data 261 for the certificate generator 210 to use in generating the certificate. A request to generate a certificate can also indicate the one or more products that are related to the certificate. The certificate generator 210 can access certificate configuration data 261 as specified by the data collector 205 and generate the requested product-related certificate. The certificate generator 210 can include a digital signature in a product-related certificate to give a recipient reason to believe that the certificate was created by a known sender. The certificate generator 210 can include an expiration period in a product-related certificate. The certificate generator 210 can also revoke an existing product-related certificate using a certification revocation list to invalidate a certificate. The product-related certificate manager 200 can distribute the product-related certificates to enable owners of the certificates to provide product information to a server computing system. The product-related certificate manager 200 can distribute the certificates by sending the product-related certificate to a client, storing the product-related certificate with product installation software, etc.

The product-related certificate manager 200 can receive a consumer request pertaining to product asset management, such as a request for the subscriptions that are available to an entity, for an entitlement for a particular product, etc. The consumer request can be from an owner of a product-related certificate, such as a client computing system and a server computing system. The consumer request can include one or more product-related certificates (e.g., product certificates). The data mapper 215 can use the OID-product attribute pairs in the product-related certificate to generate a response to a consumer request. For example, the data mapper 215 can use an OID-product_name pair in a product certificate to search mapping data 263 that is stored in the data store 260 to identify a product name that relates to the OID in the product certificate. The mapping data 263 can include OIDs that are mapped to product attributes. For example, the OID "1.3.6.1.4.1.2312.9.1.12345.1" can be paired with product name "Product Foo." One embodiment of a method of using OID-product_name pairs in a product certificate is described in greater detail below in conjunction with FIG. 5.

The data mapper 215 can store search results as mapping results 265 in the data store 260. The data mapper 215 can provide the mapping results 265 to generate a response to a consumer request. For example, the data mapper 215 can provide the mapping results 265 to a product asset management system to use to determine how to respond to a request for a list of product subscriptions that are available to an entity. In another example, the consumer request is for an entitlement for a "Product Foo" and the data mapper 215 can provide the mapping results 265 to a product asset management system to use to determine whether to grant an entitlement to an entity for "Product Foo". One embodiment of a method of providing mapping results to generate a response to a consumer request is described in greater detail below in conjunction with FIG. 5.

The certificate validator 225 can determine whether a product-related certificate that is received in a consumer request is valid by validating a signature in the product-related certificate using the sender's public key, by determining whether or not the product-related certificate has been revoked by checking a certificate revocation list, and/or by determining whether or not the product-related certificate has expired based on expiration data in the certificate. The certificate validator 225 can store the validation results as part of the mapping results 265 in the data store 260.

Figure 3:
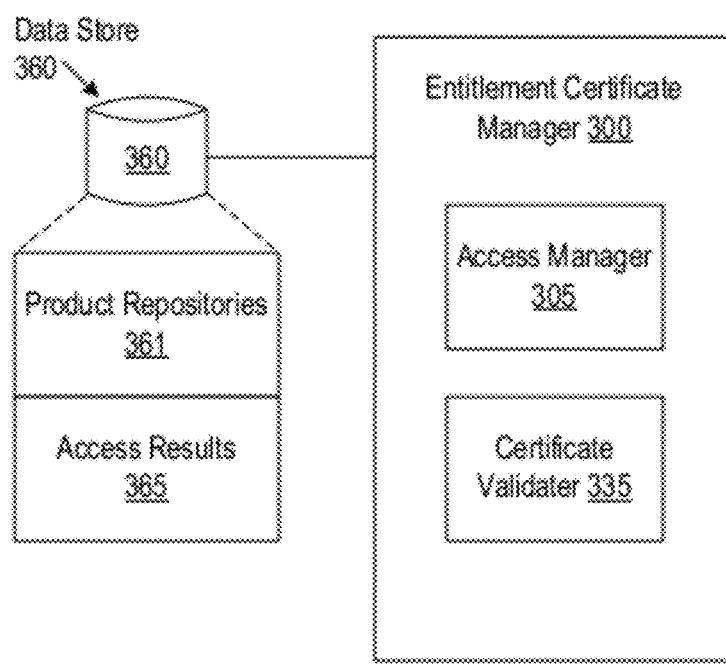
FIG. 3 is a block diagram of one embodiment of an entitlement certificate manager.

FIG. 3 is a block diagram of one embodiment of an entitlement certificate manager 300 for using product-related certificates to manage access to product repositories. The entitlement certificate manager 300 can be the same as the entitlement certificate manager 112 hosted by a server 160 of FIG. 1. The entitlement certificate manager 300 includes an access manager 305 and a certificate validator 325.

The access manager 305 can receive a consumer request pertaining to product asset management, such as a request for access to a product repository. The consumer request can be from an owner of a product-related certificate, such as a client computing system and a server computing system. The consumer request includes one or more product-related certificates and a URL to access. The product-related certificate can be an entitlement certificate that specifies a location of one or more product repositories that the entity (e.g., client) is authorized to access. The access manager 305 can be coupled to one or more data stores 360 that include product repositories 361 storing product related material that may require authorization before it can be accessed, such as, product installation software, product update software, product documentation, etc.

The access manager 305 can use OID-URL pairs in the product-related certificate (e.g., entitlement certificate) to generate a response to a consumer request for access to a product repository. The access certificate manager 305 can identify OIDs in the entitlement certificate that are configured to be paired with a location of a product repository (e.g., URL) and identifies the URL in the entitlement certificate that is paired with the OID. The URLs in the entitlement certificate that are paired with the OIDs represent locations of product repositories which an owner of the entitlement certificate is authorized to access. The access certificate manager 305 can determine whether the URL in the consumer request matches any of the URLs that are paired with OIDs in the entitlement certificate and can store access results 365 indicating whether the there is a match in the data store 360. One embodiment of a method of using OID-URL pairs in the product-related certificate to generate a response to a consumer request for access to a product repository is described in greater detail below in conjunction with FIG. 7. The access certificate manager 305 can provide the access results 365 to a content server, and the content server can generate a response to the consumer request based on the access results 365, such as granting the client access to the URL.

The certificate validator 335 can determine whether a product-related certificate (e.g., entitlement certificate) that is received in a consumer request is valid by validating a signature in the product-related certificate using the sender's public key, by determining whether or not the product-related certificate has been revoked by checking a certificate revocation list, and/or by determining whether or not the product-related certificate has expired based on expiration data in the certificate. The certificate validator 335 can store the validation results as part of the access results 365 in the data store 360. The certificate validator 335 can provide access results (e.g., validation results), for example, to a content server, indicating that the entitlement certificate is not valid and that access to the URL specified in the request should not be granted.

Figure 4:
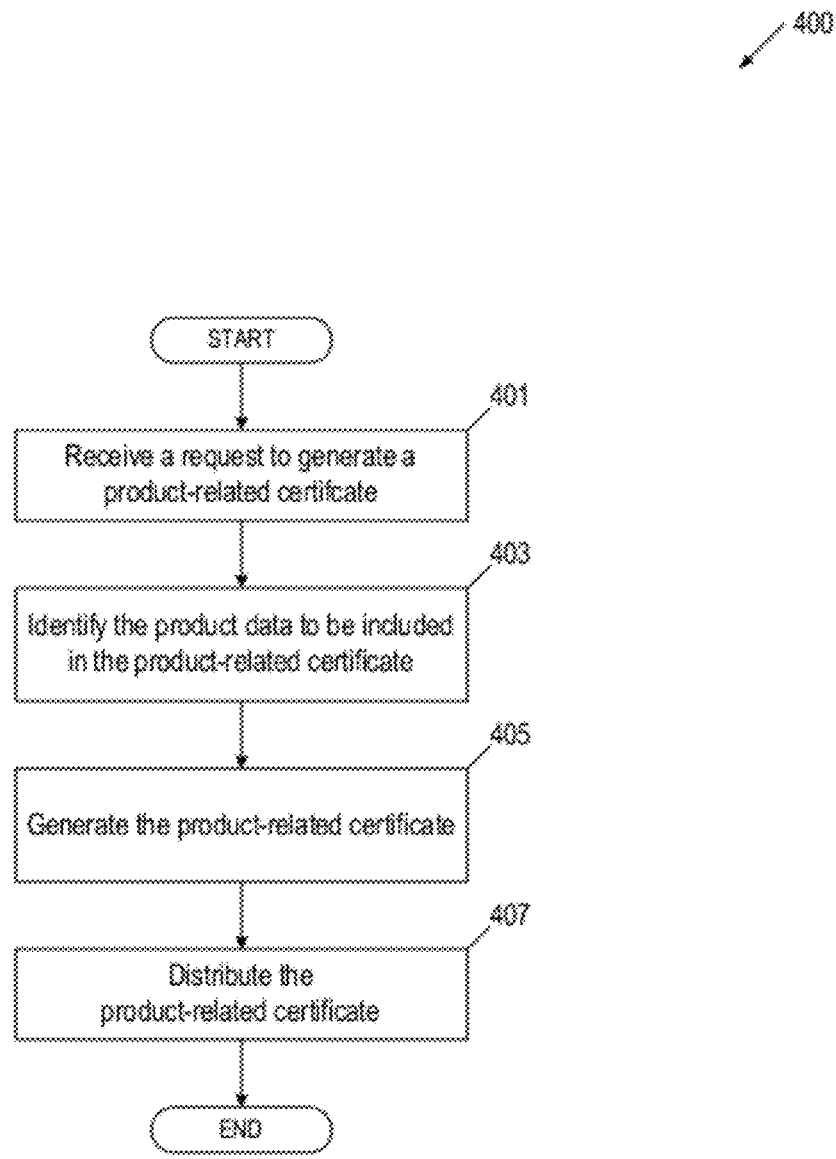
FIG. 4 is a flow diagram of an embodiment of a method for generating product-related certificates to create product mappings.

FIG. 4 is a flow diagram of an embodiment of a method 400 for generating product-related certificates to create product mappings. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the product-related certificate manager 110 hosted by a server 150 of FIG. 1.

In one embodiment, the method 400 starts with the product-related certificate manager receiving a request to generate a product-related certificate. The request can be user input received via a user interface. For example, a user may enter a command via a command line interface requesting the product-related certificate manager to generate product certificates. In another example, the request may be received from a product asset management system requesting the product-related certificate manager to generate an entitlement certificate. At block 403, the product-related certificate manager identifies the product data to be included in the product-related certificate. The product data can be in certificate configuration data that is stored in a data store that is coupled to the product-related certificate manager. The product-related certificate manager selects the certificate configuration data that corresponds to the request based on the certificate type and the one or more products identified in the request. The request can include data identifying the type of certificate to be generated (e.g., a product certificate, an entitlement certificate) and one or more products relating to the request.

At block 405, the product-related certificate manager generates the product-related certificate using the selected certificate configuration data. At block 407, the product-related certificate manager distributes the certificate to enable an owner of the product-related certificate to provide product information to a server computing system in a network environment. For example, a product certificate can provide information indicating the products that are installed in a client. In another example, an entitlement certificate can provide information indicating the product repositories which a client is authorized to access.

Figure 5:
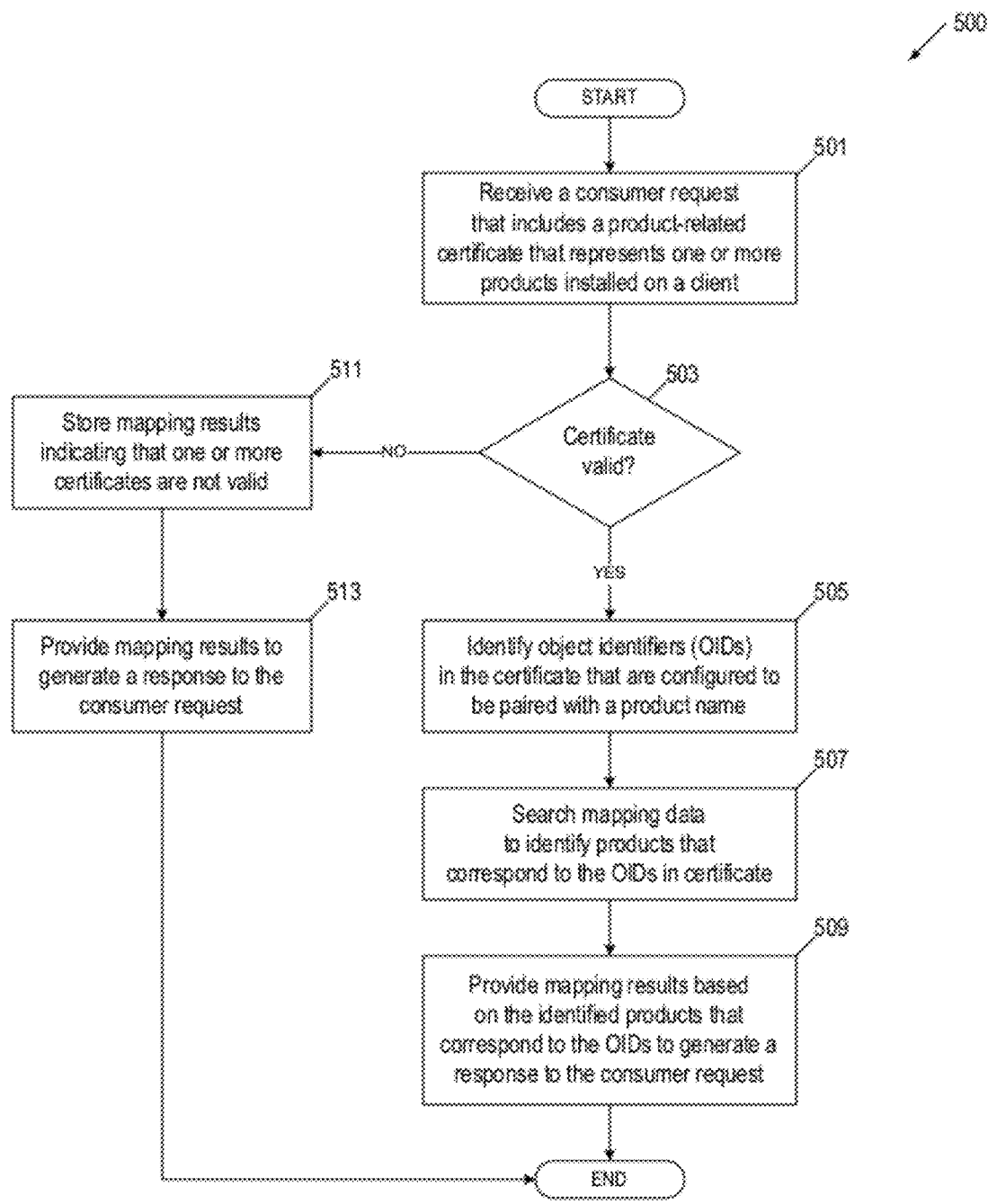
FIG. 5 is a flow diagram of an embodiment of a method for using a product-related certificate to create product mappings to respond to a consumer request.

FIG. 5 is a flow diagram of an embodiment of a method 500 for using a product-related certificate to create product mappings to respond to a consumer request. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the product-related certificate manager 110 hosted by a server 150 of FIG. 1.

In one embodiment, the method 500 starts with the product-related certificate manager receiving a consumer request pertaining to product asset management at block 501. The consumer request may be for a list of product subscriptions that are available to a client, for an entitlement for a particular product, etc. The consumer request includes one or more product certificates that represent one or more products that are installed in a system. In one embodiment, at block 503, the product-related certificate manager receives the one or more product certificates and determines whether the product certificates are valid by validating a signature in the product certificates using the sender's public key, by determining whether or not a product certificate has been revoked using a certificate revocation list, and/or by determining whether a product certificate has expired based on expiration data in a certificate.

In one embodiment, if the one or more product certificates are not valid (block 503), the product-related certificate manager stores mapping results indicating that the one or more product certificates are not valid in a data store that is coupled to the product-related certificate manager at block 511. At block 513, the product-related certificate manager provides the mapping results (e.g., validation results) to a product asset management system indicating that one or more product certificates are not valid. The product asset management system can send a message to the client indicating one or more product certificates are not valid.

Figure 6:
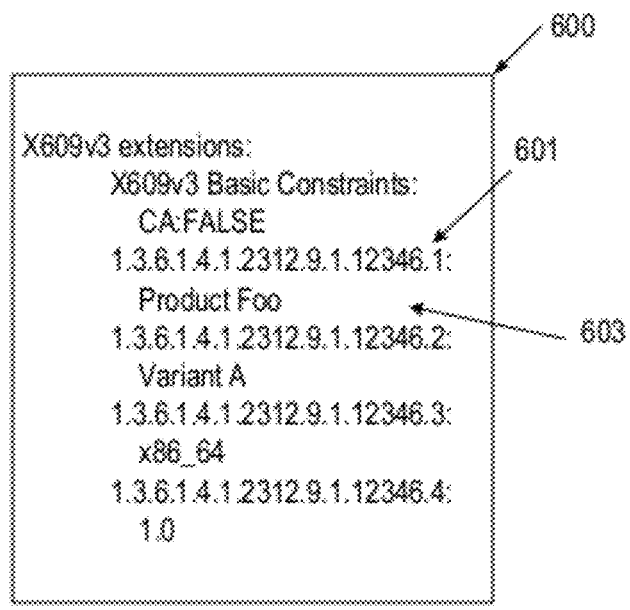
FIG. 6 is a portion of an exemplary product certificate.

The product certificate(s) include extended attribute object identifiers (OIDs), each of which is paired with a product attribute. An OID can be a value in a hierarchical numbering scheme. For example, an OID can be "1.3.6.1.4.1.2312.9.1.12345.1". Examples of product attributes that can be paired with an OID can include, and are not limited to, a product name, a product variant, a system architecture that is supported by a product, a product version, a location of a product repository, and a metadata tag pertaining to a client task to be performed. For example, the OID "1.3.6.1.4.1.2312.9.1.12345.1" can be paired with product name "Product Foo." FIG. 6 illustrates a portion of an exemplary product certificate 600 that includes an extended attribute object identifier 601 paired with a product name 603.

Returning to FIG. 5, at block 505, for each valid product certificate, the product-related certificate manager identifies OIDs in the product certificate that are configured to be paired with a product name. A particular type of OID can be configured to correspond to a product name. For example, any OID in a product certificate that ends with ".1" may be paired with a product name. The product certificate can include more than one OID that relates to a product name. The product-related certificate manager identifies the OIDs in the product certificate that end with ".1". At block 507, the product-related certificate manager searches mapping data that is stored in a data store for matching OIDs to validate that the product(s) identified in the one or more product certificates are valid products that are being managed by the product asset management system. The mapping data stored in the data store can include OIDs that are mapped to product names. The product-related certificate manager can identify the product name that corresponds to each OID that matches an OID in the product certificate, if any, and include them in the mapping results.

At block 509, the product-related certificate manager provides the mapping results to generate a response to the consumer request. The results can be provided to a product asset management system, which can determine how to respond to the consumer request. For example, the mapping results can include the product name "Product Foo" and the product asset management system can use "Product Foo" and product business model data to generate a list of product subscriptions that are available and applicable to an entity. Examples of product business model data can include, and are not limited to, subscription data, product data, entitlement data, identity data, event publishing data, user data, business rules, batch job data, etc. The list may include "Product Foo" since this product is already installed in the entity and a subscription for "Product Foo" may have been purchased.

In another example, the consumer request is from a client for an entitlement for a product, "Product Foo", and includes a product certificate. The product asset management system can use mapping results (e.g., the product name "Product Foo"), which are generated from using the product certificate, and product business model data, such as rules data and subscription data, to determine whether the client is authorized to receive an entitlement certificate. In one embodiment, a consumer request does not include a product certificate. For example, a consumer request for an entitlement for "Product Foo" does not include a product certificate, and the product asset management system can use product business model data, such as rules data and subscription data, to determine whether the client is authorized to receive an entitlement certificate. The product asset management system can generate the entitlement certificate based on a determination that the client is authorized to receive an entitlement, and send the entitlement certificate to the client.

Figure 7:
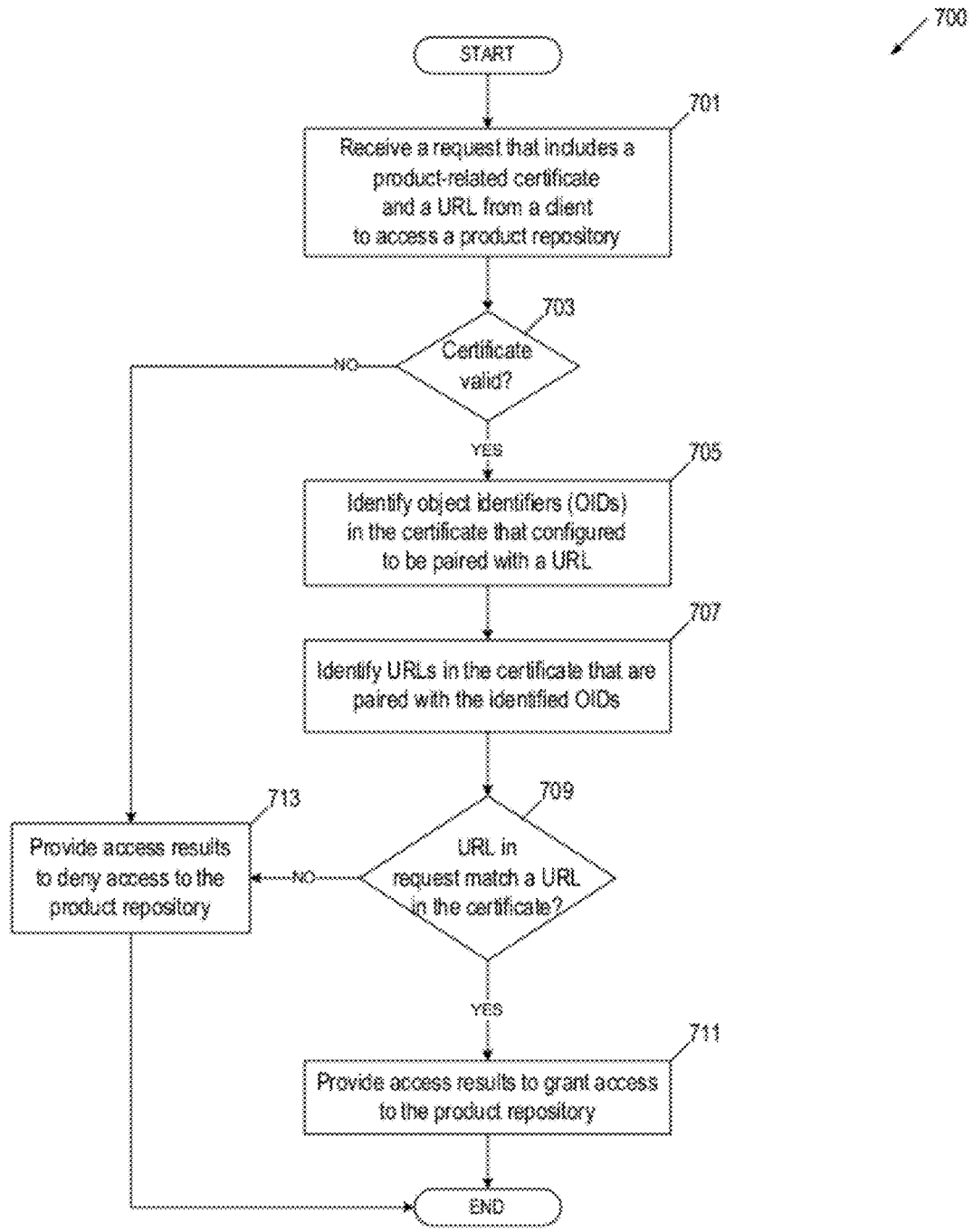
FIG. 7 is a flow diagram of an embodiment of a method for using a product-related certificate to manage access to product repositories.

FIG. 7 is a flow diagram of an embodiment of a method 700 for using a product-related certificate to manage access to product repositories. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the entitlement certificate manager 112 hosted by a server 160 of FIG. 1.

Figure 8:
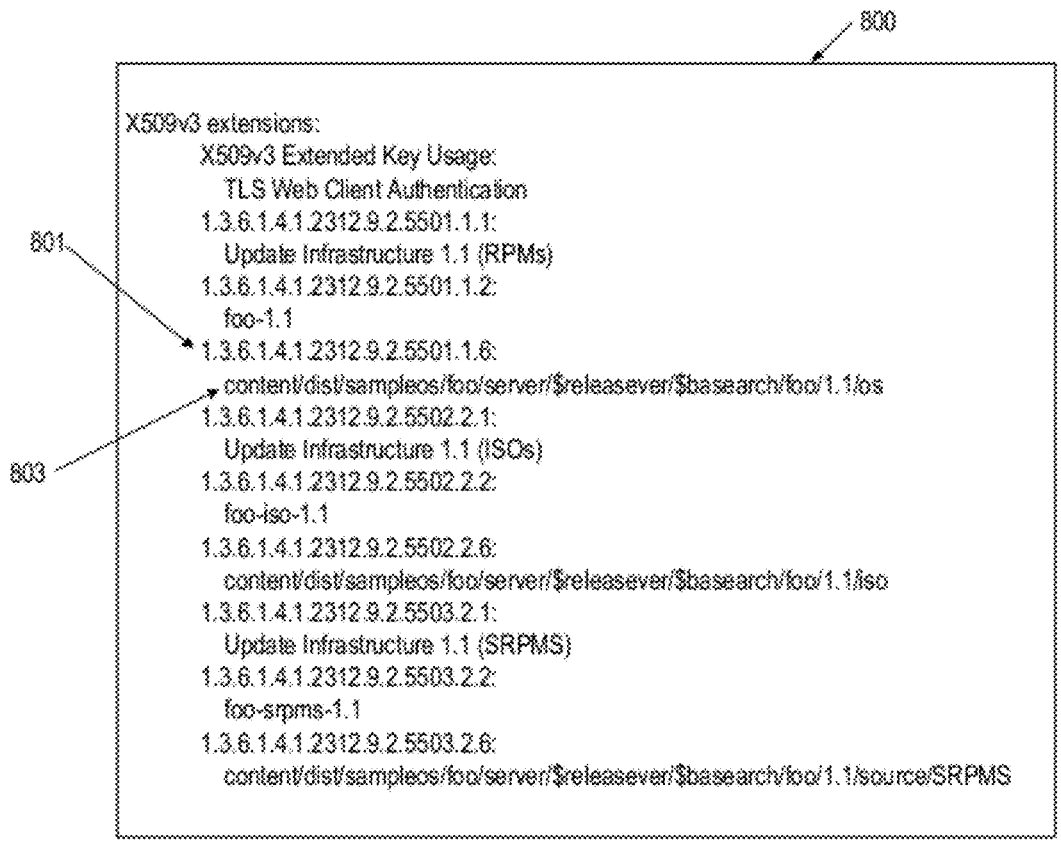
FIG. 8 is a portion of an exemplary entitlement certificate.

In one embodiment, the method 700 starts with the entitlement certificate manager receiving a consumer request from a client for access to a product repository at block 701. The consumer request includes a product-related certificate and a URL to access. The product-related certificate is an entitlement certificate that specifies a location of one or more product repositories that the entity (e.g., client) is authorized to access. The product repositories can store product related material that may require authorization before it can be accessed, such as, product installation software, product update software, product documentation, etc. The entitlement certificate includes extended attribute OIDs, each of which is paired with a product attribute. Examples of product attributes that can be paired with an OID can include, and are not limited to, a location of a product repository (e.g., a URL), a product name, a product variant, a system architecture that is supported by a product, a product version, and a metadata tag pertaining to a client task to be performed. For example, the OID "1.3.6.1.4.1.2312.9.2.5501.1.6" can be paired with a URL of a product repository "content/dist/sampleos/foo/server/$releasever/$basearch/foo/1.1/os." FIG. 8 illustrates a portion of an exemplary entitlement certificate 800 that includes an extended attribute object identifier 801 paired with a URL 803 of a product repository.

Returning to FIG. 7, at block 703, the entitlement certificate manager determines whether the entitlement certificate is valid by validating a signature in the entitlement certificate using the sender's public key, by determining whether or not the entitlement certificate has been revoked by checking a certificate revocation list, and/or by determining whether or not the entitlement certificate has expired based on expiration information included in the certificate. If the entitlement certificate is not valid (block 703), the entitlement certificate manager can provide access results (e.g., validation results), for example, to a content server, indicating that the entitlement certificate is not valid and that access to the URL specified in the request should not be granted at block 713. The content server can deny a client access to the URL based on the mapping results. The entitlement certificate manager can store the access results (e.g., validation results) in a data store that is coupled to the certificate manager.

If the entitlement certificate is valid (block 703), the entitlement certificate manager identifies OIDs in the entitlement certificate that are configured to be paired with a location of a product repository (e.g., URL) at block 705. A particular type of OID can be configured to be paired with a location of a product repository. For example, any OID in an entitlement certificate that ends with ".6" may be paired with a URL. The entitlement certificate can include more than one OID that is paired with a URL. The entitlement certificate manager identifies the OIDs in the entitlement certificate that end with ".6". At block 707, for each OID in the certificate that is configured to be paired with a URL (e.g., OIDs that end with ".6"), the entitlement certificate manager identifies the URL in the entitlement certificate that is paired with the OID. The URLs in the entitlement certificate that are paired with the OIDs represent locations of product repositories which an owner of the entitlement certificate is authorized to access. At block 709, the entitlement certificate manager determines whether the URL in the consumer request matches any of the URLs that are paired with OIDs in the entitlement certificate. The URL in the request matching one of the URLs in the entitlement certificate can be an indication that the owner of the entitlement certificate is authorized to access the URL that is in the request. A match can include a partial match of the URLs, for example, based on matching rules. An example of a matching rule can include, and is not limited to, if there is 'variable' in the URL in the entitlement certificate, such as '$' in '$releasever', the entitlement certificate manager can treat the variable (e.g., '$') as a wildcard, such that the entitlement certificate manager matches any directory at that level of the URL.

If the URL in the consumer request matches one of the URLs that are paired with OIDs in the entitlement certificate (block 709), the entitlement certificate manager can provide access results, for example, to a content server, indicating that access to the URL specified in the request can be granted at block 711. The content server can generate a response to the consumer request based on the access results, such as granting the client access to the URL. The client can, for example, access the URL to obtain a software update. If the URL in the consumer request does not match any of the URLs that are paired with OIDs in the entitlement certificate (block 709), the entitlement certificate manager can provide access results indicating that access to the URL specified in the request should not be granted at block 713. A content server can generate a response to the consumer request based on the access results, such as denying the client access to the URL.

Figure 9:
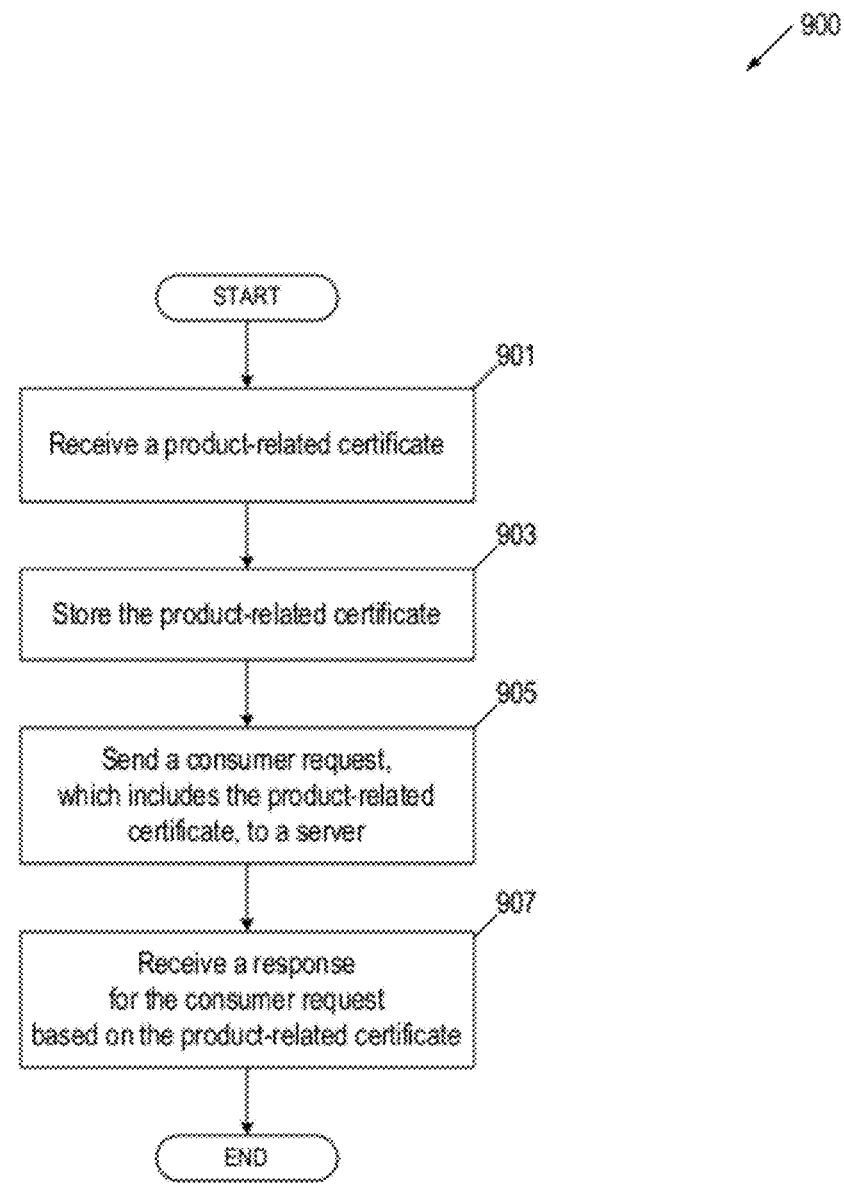
FIG. 9 is a flow diagram of an embodiment of a method for using product-related certificates to create product mappings for product asset management consumer requests.

FIG. 9 is a flow diagram of an embodiment of a method 900 for using product-related certificates to create product mappings for product asset management consumer requests. Method 900 can be performed by processing logic that can comprise hardware (e.g., circuitry, dedicated logic, programmable logic, microcode, etc.), software (e.g., instructions run on a processing device), or a combination thereof. In one embodiment, method 900 is performed by the client certificate manager 106 in a client tool 113 hosted by a client 140 of FIG. 1. In one embodiment, the method 900 starts with client certificate manager receiving a product-related certificate at block 901 and locally storing the product-related certificate at block 903. A product-related certificate, such as a product certificate, can be stored in the data store that is coupled to the client certificate manager as part of a product software installation procedure. A product-related certificate, such as an entitlement certificate, can be received from a product asset management system and can be stored in the data store.

At block 905, the client certificate manager generates a consumer request and includes an appropriate product-related certificate in the consumer request. The client certificate manager can receive input, such as user input received via a user interface (e.g., command line interface, GUI) of the type of consumer request to generate. The client certificate manager can be coupled to configuration data that associates a type of consumer request with a type of product-related certificate. For example, the configuration data can associate a request for product subscriptions that are available to an entity to a product certificate type, a request for an entitlement for a particular product to a product certificate type, a request to access a product repository to an entitlement certificate type, etc. The client certificate manager can use the configuration data to determine which type of product-related certificate to include in a consumer request. The client certificate manager can also include additional data in a consumer request based on the type of request. For example, for a request to access a product repository, the client certificate manager can generate a consumer request that includes a URL and an entitlement certificate. The client certificate manager can obtain the URL to be included in a consumer request for access to a product repository, for example, from product software that is installed on a client. The product installation software can include URL(s) to be accessed for product updates. The product installation software can also include metadata which can be used to identify the URL to be included in the consumer request. In another example, the client certificate manager receives user input, for example, from a system administrator, identifying the URL to be included in the consumer request. At block 905, the client certificate manager sends the consumer request to an appropriate server computing system (e.g. content server, product asset management server) and receives a response based on the product-related certificate that was included in the request at block 907.

Figure 10:
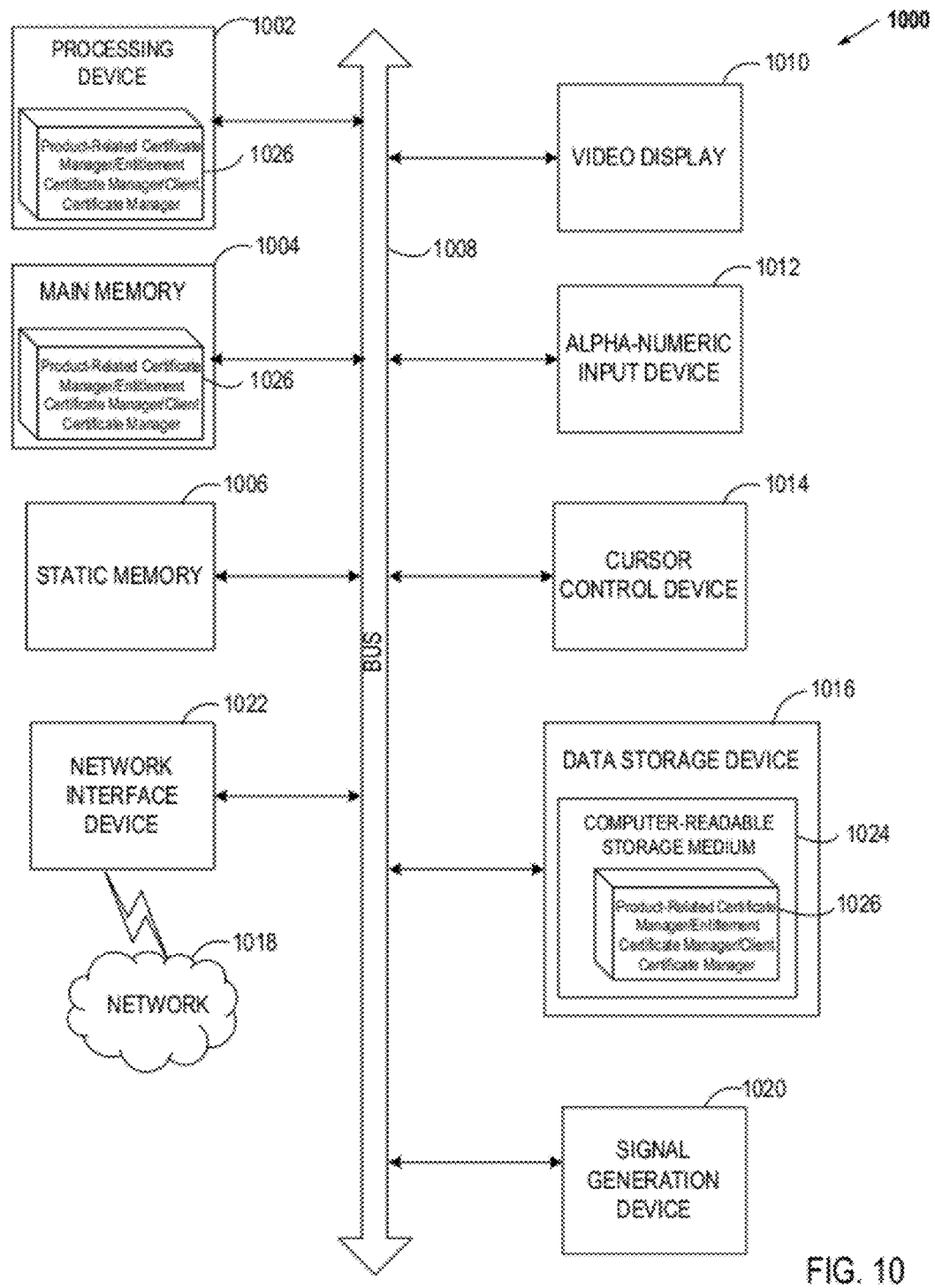
FIG. 10 is a diagram of one embodiment of a computer system for using a product-related certificate to create product mappings.

FIG. 10 is a diagram of one embodiment of a computer system for using certificates to create product mappings. Within the computer system 1000 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or DRAM (RDRAM), etc.), a static memory 1006 (e.g., flash memory, static random access memory (SRAM), etc.), and a secondary memory 1016 (e.g., a data storage device in the form of a drive unit, which may include fixed or removable computer-readable storage medium), which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute the product-related certificate manager, entitlement certificate manager, and/or the client certificate manager 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)) connected to the computer system through a graphics port and graphics chipset, an alphanumeric input device 1012 (e.g., a keyboard), a cursor control device 1014 (e.g., a mouse), and a signal generation device 1020 (e.g., a speaker).

The secondary memory 1016 may include a machine-readable storage medium (or more specifically a computer-readable storage medium) 1024 on which is stored one or more sets of instructions (e.g., the product-related certificate manager, entitlement certificate manager, and/or the client certificate manager 1026) embodying any one or more of the methodologies or functions described herein. The product-related certificate manager, entitlement certificate manager, and/or the client certificate manager 1026 may also reside, completely or at least partially, within the main memory 1004 and/or within the processing device 1002 during execution thereof by the computer system 1000, the main memory 1004 and the processing device 1002 also constituting machine-readable storage media. The product-related certificate manager, entitlement certificate manager, and/or the client certificate manager 1026 may further be transmitted or received over a network 1018 via the network interface device 1022.

The computer-readable storage medium 1024 may also be used to store the product-related certificate manager, entitlement certificate manager, and/or the client certificate manager 1026 persistently. While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The product-related certificate manager, entitlement certificate manager, and/or the client certificate manager 1026, components and other features described herein (for example in relation to FIG. 2) can be implemented as discrete hardware components or integrated in the functionality of hardware components such as ASICS, FPGAs, DSPs or similar devices. In addition, the product-related certificate manager, entitlement certificate manager, and/or the client certificate manager 1026 can be implemented as firmware or functional circuitry within hardware devices. Further, the product-related certificate manager, entitlement certificate manager, and/or the client certificate manager 1026 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "detecting," "obtaining," "creating," "presenting," "storing," "replacing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for using certificates to create product mappings is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method-comprising:
   receiving, by a processor, a consumer request comprising a product-related certificate representative of a computer-related product resident to a client computer, a sender's public key, and a product attribute, the product related certificate comprising data relating to an entitlement certificate assigned to the client computer for governing access to a repository of computer installation products and a resource identifier for identifying a location of the repository of computer installation products
   identifying, by the processor, a product entitlement from the product related certificate;
   identifying, by the processor, the resource identifier in the entitlement certificate associated to the product attribute;
   mapping, by the processor, the resource identifier to the product attribute;
   mapping the uniform resource identifier to the unique identifier, and
   returning to the client computer a response specifying a client computer access right to the location of the repository, the client computer access right defined using the mapping of the resource identifier to the product attribute.

2. The method of claim 1, further comprising:
   storing mapping data in the data store, the mapping data comprising the product attribute and a product name that corresponds to the product attribute.

3. The method of claim 1, wherein the product attribute comprises a value using a hierarchical numbering scheme.

4. The method of claim 1, wherein the response comprises: a list of product subscriptions that are available to an entity in view of the product that is identified in the data store using the product-related certificate.

5. The method of claim 1, wherein the product-related certificate is a product certificate that represents a product that is installed in the client computer and the product attribute corresponds to a name of a product that is installed in the client computer.

6. The method of claim 5, wherein the product certificate further comprises one of: a product attribute that is associated with a variant of the product, a product attribute that is associated with a system architecture that is supported by the product, a product attribute that is associated with a version of the product, a product attribute that is associated with a document related to the product, or a product attribute that is associated with a metadata tag relating to a client task.

7. The method of claim 1, further comprising:
   identifying product data for a product to be included in the product-related certificate;
   generating the product-related certificate using the identified product data; and distributing the product-related certificate to enable an owner of the product-related certificate to provide product information to the processor in a network environment.

8. The method of claim 7, wherein distributing the product-related certificate comprises:
storing the product-related certificate in a data store that stores installation software of the product.

9. A system comprising:
data store to store mapping data; and
a processor coupled to the data store, the processor to
receive a consumer request comprising a product-related certificate representative of a computer-related product resident to a client computer, a sender's public key, and a product attribute, the product related certificate comprising data relating to an entitlement certificate assigned to the client computer for governing access to a repository of computer installation products and a resource identifier for identifying a location of the repository of computer installation products;
identify a product entitlement from the product related certificate;
identify the resource identifier in the entitlement certificate associated to the product attribute;
map the resource identifier to the product attribute; and
map the uniform resource identifier to the unique identifier, and
return to the client computer a response specifying a client computer access right to the location of the repository, the client computer access right defined using the mapping of the resource identifier to the product attribute.

10. The system of claim 9, wherein the product attribute comprises a value using a hierarchical numbering scheme.

11. The system of claim 9, wherein the response comprises a list of product subscriptions that are available to an entity in view of the product that is identified in the data store using the product-related certificate.

12. The system of claim 9, wherein the product-related certificate is a product certificate that represents a product that is installed in the client computer and the product attribute in the product-related certificate corresponds to a name of a product that is installed in the client computer.

13. The system of claim 12, wherein the product certificate further comprises one of: a product attribute that is associated with a variant of the product, a product attribute that is associated with a system architecture that is supported by the product, a product attribute that is associated with a version of the product, a product attribute that is associated with a document related to the product, or a product attribute that is associated with a metadata tag relating to a client task.

14. The system of claim 9, further comprising:
the data store to store product data for the product; and
the processor to: identify the product data for a product to be included in the product-related certificate, to generate the product-related certificate using the identified product data, and to distribute the product-related certificate to enable an owner of the product-related certificate to provide product information to the processor in a network environment.

15. The system of claim 14, further comprising:
the data store to store installation software of the product; and the processor to package the product-related certificate with the installation software of the product in the data store.

16. The system of claim 9, further comprising:
the data store to store the product-related certificate comprising the product attribute, the product attribute having a corresponding product name; and
the client computer coupled to the data store to:
receive the product-related certificate from the processor and
to send the consumer request pertaining to product asset management to the processor, wherein the consumer request comprises the product-related certificate.

17. A non-transitory computer-readable storage medium including instructions that, when executed by a processor, cause the processor to perform a set of operations comprising:
receiving, by the processor, a consumer request comprising a product-related certificate representative of a computer-related product resident to a client computer, a sender's public key, and a product attribute, the product related certificate comprising data relating to an entitlement certificate assigned to the client computer for governing access to a repository of computer installation products and a resource identifier for identifying a location of the repository of computer installation products;
identifying, by the processor, a product entitlement from the product related certificate;
identifying, by the processor, the resource identifier in the entitlement certificate associated to the product attribute;
mapping, by the processor, the resource identifier to the product attribute;
mapping the uniform resource identifier to the unique identifier, and
returning to the client computer a response specifying a client computer access right to the location of the repository, the client computer access right defined using the mapping of the resource identifier to the product attribute.

18. The non-transitory computer-readable storage medium of claim 17, further comprising:
storing mapping data in the data store, the mapping data comprising the product attribute and a product name that corresponds to the product attribute.

19. The non-transitory computer-readable storage medium of claim 17, wherein the product-related certificate is a product certificate that represents a product that is installed in a client computer and the product attribute in the product-related certificate corresponds to a name of a product that is installed in the client computer.

20. The non-transitory computer-readable storage medium of claim 17, further comprising:
identifying product data for a product to be included in the product-related certificate;
generating the product-related certificate using the identified product data; and
distributing the product-related certificate to enable an owner of the product-related certificate to provide product information to the processor in a network environment.

* * * * *